G. H. CUNARD.
SHEARS.
APPLICATION FILED APR. 24, 1914.

1,115,404.

Patented Oct. 27, 1914.

Witnesses
J. T. L. Wright
V. B. Hillyard

Inventor
George H. Cunard
By Victor J. Evans
Attorney

UNITED STATES PATENT OFFICE.

GEORGE H. CUNARD, OF IRON RIVER, MICHIGAN.

SHEARS.

1,115,404.  Specification of Letters Patent.  Patented Oct. 27, 1914.

Application filed April 24, 1914. Serial No. 834,193.

*To all whom it may concern:*

Be it known that I, GEORGE H. CUNARD, a citizen of the United States, residing at Iron River, in the county of Iron and State of Michigan, have invented new and useful Improvements in Shears, of which the following is a specification.

The invention relates to shears of the type intended for cutting textile or like fabric, the purpose being to provide a pair of shears which is automatic in operation in so far as the operator is not required to manipulate the blades in the ordinary way, it being required only to move the device over a surface with a rotary tractor in contact with such surface and driven thereby, suitable connections between such rotary tractor and pivoted shear blades serving to operate the latter by a pivotal movement, the cutting being effected in the ordinary way by the closing of the blades upon the goods arranged between them.

The invention consists of a pair of shears embodying a relatively fixed blade, a movable blade pivoted to the fixed blade, a handle having connection with the fixed blade, a rotary tractor in the shape of a small wheel mounted upon the fixed part and means for utilizing the movement of the rotary tractor for imparting oscillatory movement to the pivoted shear blade as the implement is run over a surface with a rotary tractor in contact therewith.

The invention consists of the novel features, details of construction and combination of parts, which hereinafter will be more particularly set forth, illustrated and claimed.

Figure 1:
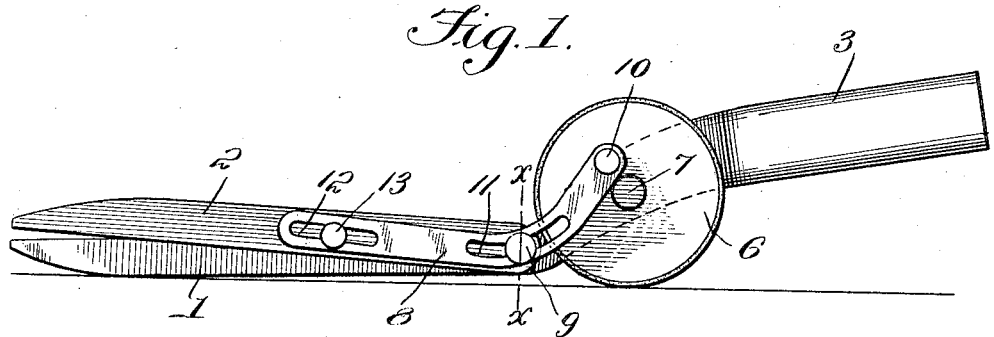
Figure 2:
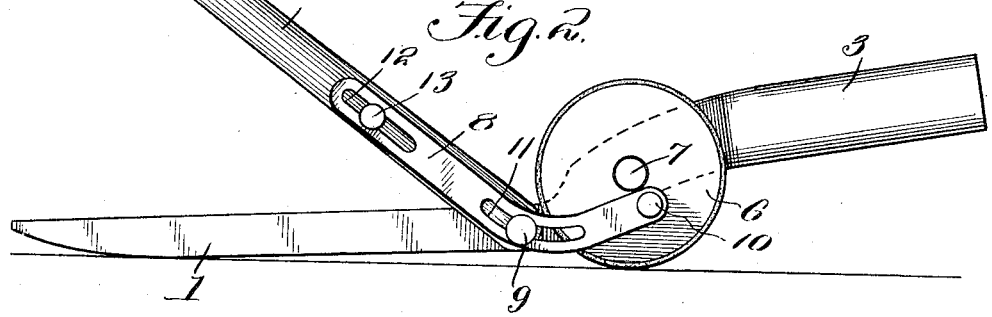
Figure 3:
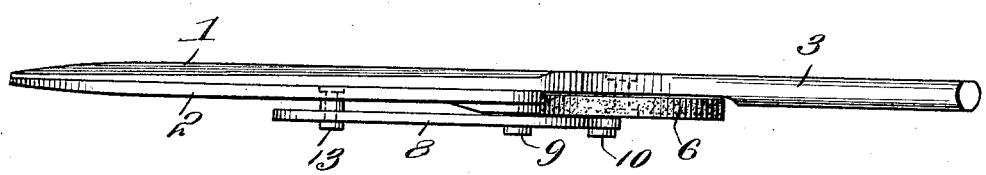
Figure 4:
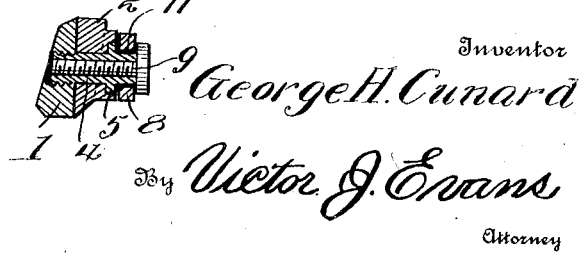

In the drawings hereto attached:—Figure 1 is a side view of a pair of shears embodying the invention showing the relation of the parts when the blades are closed. Fig. 2 is a view similar to Fig. 1 showing the relation of the parts when the blades are open. Fig. 3 is a top plan view. Fig. 4 is an enlarged section on the line *x—x* of Fig. 1.

Corresponding and like parts are referred to in the following description, and indicated in all the views of the drawings, by the same reference characters.

The shears comprise two blades 1 and 2 which are pivotally connected, one of such blades being relatively fixed and the other movable. A handle 3 is connected with the fixed blade 1 and is offset therefrom so as to occupy a position above the surface upon which the blade 1 may be resting when the implement is in use. By having the handle 3 offset vertically ample clearance is had for the fingers of the hand when the device is gripped and passed over the surface supporting the goods or article to be cut. A hollow screw 4 is threaded into the fixed blade 1 and is formed with a shoulder 5 intermediate of its ends, such hollow screw forming a pivot fastening for the blade 2, the shoulder 5 being countersunk into a pivoted blade so as not to be in the way. A small wheel 6 is mounted upon a pin or stud 7 set into the handle 3 and the outer edge of such small wheel is roughened or covered with rubber or other material to insure positive engagement between such wheel and the surface thereby preventing slipping and insuring rotation of the wheel when moving the shears over the surface upon which the goods or article is placed to be cut. The wheel 6 constitutes the rotary tractor which is utilized as means for imparting an oscillatory movement to the pivoted blade 2.

The means for transmitting movement from the rotary tractor to the pivoted blade 2 consists of a lever 8 which is mounted upon the outer end of the hollow screw 4 and is retained in place thereon by means of a screw 9 threaded into the hollow screw 4. The rear end of the lever 8 curves upwardly and is connected by means of a wrist pin 10 with the rotary tractor 6. A slot 11 is formed in the bend of the lever 8 and receives the projecting end of the hollow screw 4 upon which such lever pivots and slides. A slot 12 is formed in the outer end of the lever 8 and receives a fastening 13 which is let into the blade 2 at a point intermediate of its ends. When the rotary tractor 6 is in operation the lever 8 receives a combined longitudinal and oscillatory movement, the latter being imparted to the pivoted blade 2 whereby such blade opens and closes and cuts a fabric or other article that may be placed between the blades. The parts are so arranged that when the blades 1 and 2 are closed the forward ends thereof stand apart slightly thereby retaining the goods in place and preventing the same from passing over or beneath the blades.

In the operation of shears embodying the invention the goods to be cut are spread upon a surface such as a table or counter and the shears are arranged with a portion of the goods passing between the blades 1 and 2 after which the handle 3 is gripped in the hand and the instrument moved over the surface with the rotary tractor in contact therewith whereby such rotary tractor is set in motion and the blade 2 caused to oscillate thereby cutting the goods which may be rapidly, effectively and conveniently performed since all that is required of the operator is to exert sufficient pressure to hold the rotary tractor in engagement with the surface and to move the device over such surface.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. Shears comprising a relatively fixed blade having a handle in connection therewith, a movable blade pivotally connected with the fixed blade, a rotary tractor and a lever mounted in line with the pivot connection between the blades and having one end connected with the rotary tractor and its opposite end connected with the movable blade.

2. Shears comprising fixed and movable blades pivotally connected, a handle having connection with the fixed blade, a rotary tractor, a lever mounted in line with the pivot connection between the two blades and having an oscillatory and a sliding movement, means for connecting one end of the lever with the rotary tractor and other means connecting the opposite end of such lever with the pivoted blade.

3. Shears comprising fixed and movable blades pivotally connected, a handle having connection with the fixed blade and offset therefrom in a vertical direction, a rotary tractor. a lever mounted in line with the pivot connection between the two blades and adapted to receive a combined oscillatory and longitudinal movement, such lever having its rear portion curved upwardly, a wrist pin connection between the rear end of the lever and the rotary tractor and a pin and slot connection between the front end of the lever and the pivoted blade.

4. Shears comprising relatively fixed and pivoted blades, a hollow screw pivotally connecting the blades and having one end projecting and formed with a shoulder to engage the pivoted blade, a handle having connection with the fixed blade and offset therefrom in a vertical direction, a rotary tractor, a lever having its rear portion curved upwardly and formed at the bend with a longitudinal slot to receive the projecting end of the beforementioned hollow screw, said lever having a longitudinal slot in its front end, a wrist pin connection between the rear end of the lever and the rotary tractor, a fastening connecting the forward slotted end of the lever with the pivoted blade, and a screw let into the said hollow screw and retaining the lever in place thereon.

In testimony whereof I affix my signature in presence of two witnesses.

GEORGE H. CUNARD.

Witnesses:
EDWARD P. LOTT,
JOSEPH KOPUSTA.

---

Copies of this patent may be obtained for five cents each, by addressing the "Commissioner of Patents. Washington, D. C."